(12) United States Patent
Kenney

(10) Patent No.: US 11,322,184 B1
(45) Date of Patent: May 3, 2022

(54) SYSTEM AND METHOD FOR SYNCHRONIZING MEDIA FILES WITH AUDIO TRACK

(71) Applicant: William Craig Kenney, Hunt Valley, MD (US)

(72) Inventor: William Craig Kenney, Hunt Valley, MD (US)

(*) Notice: Subject to any disclaimer, the term of this patent is extended or adjusted under 35 U.S.C. 154(b) by 0 days.

(21) Appl. No.: 17/552,779

(22) Filed: Dec. 16, 2021

(51) Int. Cl.
  *G11B 27/34* (2006.01)
  *G11B 27/031* (2006.01)

(52) U.S. Cl.
  CPC ........... *G11B 27/34* (2013.01); *G11B 27/031* (2013.01)

(58) Field of Classification Search
  CPC .............................. G11B 27/34; G11B 27/031
  USPC ........................................................ 386/241
  See application file for complete search history.

(56) References Cited

U.S. PATENT DOCUMENTS

| | | | | |
|---|---|---|---|---|
| 6,078,005 | A * | 6/2000 | Kurakake | G11B 27/34 |
| 8,699,862 | B1 * | 4/2014 | Sharifi | G11B 27/28 |
| | | | | 386/338 |
| 8,860,865 | B2 | 10/2014 | Dukellis et al. | |
| 10,178,365 | B1 * | 1/2019 | Singh | G10H 1/40 |
| 2014/0317480 | A1 | 10/2014 | Chau et al. | |
| 2017/0040039 | A1 * | 2/2017 | Snibbe | G06F 16/433 |

* cited by examiner

*Primary Examiner* — Loi H Tran
(74) *Attorney, Agent, or Firm* — Sagacity Legal, PLLC

(57) ABSTRACT

A method for synchronizing a plurality of media files with an audio track comprises obtaining the plurality of media files and the audio track including a plurality of audio samples. Each media file is associated with a metadata and each audio sample is indexed with a corresponding timecode. The method comprises detecting, while the audio track is being played, a media file transition trigger that identifies a current audio sample of the audio track as an audio sample to transition from a first media file to a second media file. The method comprises obtaining a timecode indexed with the identified audio sample corresponding to the detected media file transition trigger and associating the timecode with the metadata of the second media file to link the second media file with the audio sample. The method comprises generating a synchronized multimedia file having the linked second media file with the audio sample.

18 Claims, 6 Drawing Sheets

SYSTEM AND METHOD FOR SYNCHRONIZING MEDIA FILES WITH AUDIO TRACK

BACKGROUND OF THE INVENTION

In today's digital world, capturing a digital image is as simple as a click of a button. With a multitude of digital images being captured every day, a desirable way for users to share their captured images is to create multimedia files, for example, short videos, to provide an engaging experience to the audience. These files are shared not only with close friends and family but also are widely popular on various social media platforms to entertain the audience. Many tools have been developed to create such multimedia files; however, the existing mechanisms are slow and do not provide any flexibility to the users.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
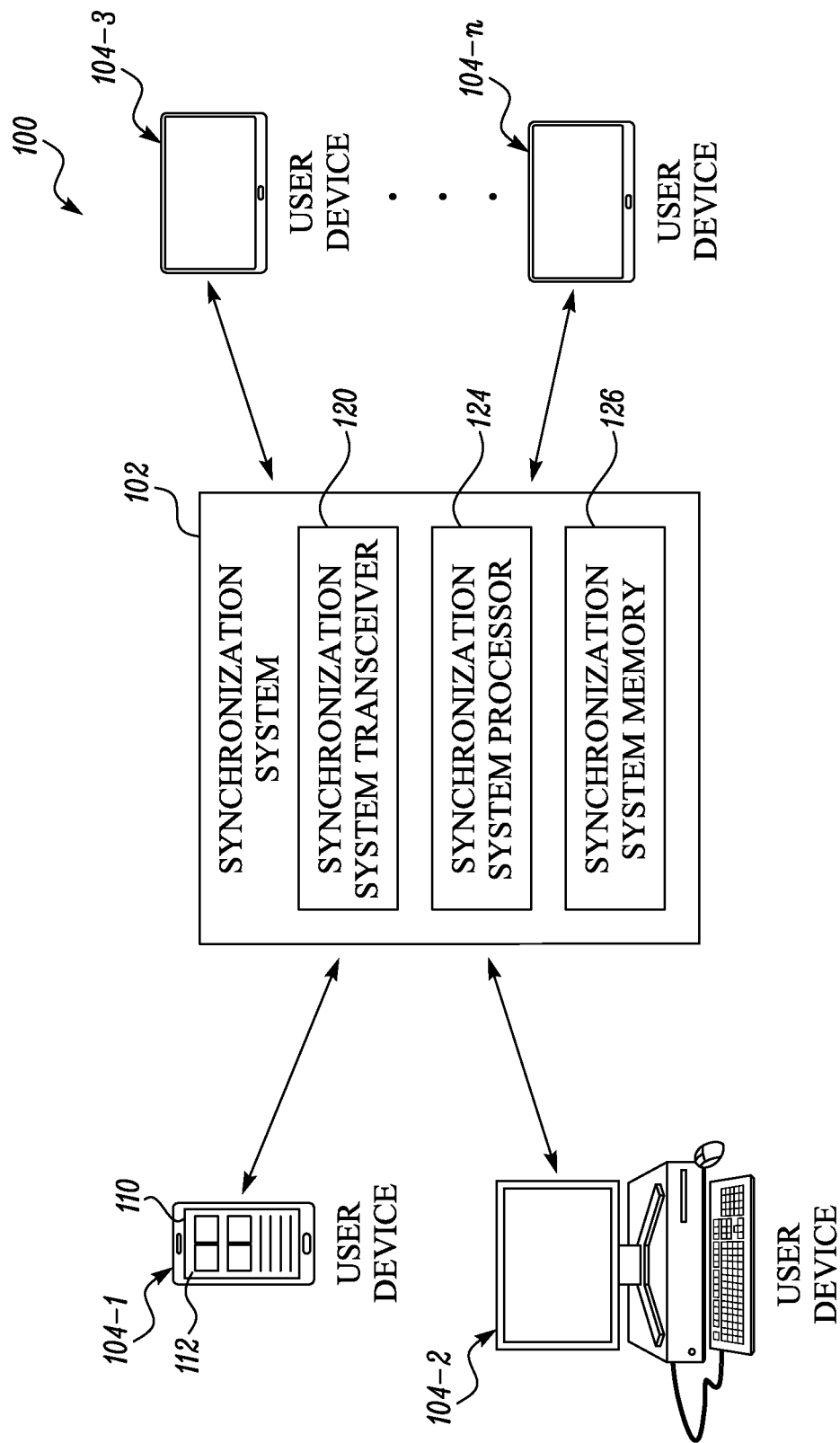
FIG. 1 illustrates an exemplary environment including a system for synchronizing a plurality of media files with an audio track, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one aspect, a method for synchronizing a plurality of media files with an audio track is described. The method comprises obtaining the plurality of media files arranged in a predefined order and the audio track including a plurality of audio samples. Each media file is associated with a metadata representing unique identification of the corresponding media file and each audio sample is indexed with a corresponding timecode. The method further comprises detecting, while the audio track is being played, a media file transition trigger. The media file transition trigger identifies a current audio sample of the audio track as an audio sample to transition from a first media file to a second media file of the plurality of media files. The method further comprises obtaining a timecode indexed with the identified audio sample of the audio track corresponding to the detected media file transition trigger and associating the obtained timecode with the metadata of the second media file to link the second media file with the identified audio sample. Further, the method comprises generating a synchronized multimedia file having the linked second media file with the identified audio sample.

In another aspect, a system for synchronizing a plurality of media files with an audio track is described. The system comprises a transceiver, a memory, and a processor communicatively coupled to the transceiver and the memory. The transceiver is configured to obtain the plurality of media files arranged in a predefined order and obtain the audio track including a plurality of audio samples. Each media file is associated with a metadata representing unique identification of the corresponding media file and each audio sample is indexed with a corresponding timecode. The memory stores instructions executable by the processor, and upon execution of the stored instructions the processor is configured to detect, while the audio track is being played, a media file transition trigger. The media file transition trigger identifies a current audio sample of the audio track as an audio sample to transition from a first media file to a second media file of the plurality of media files. The processor is further configured to obtain a timecode indexed with the identified audio sample of the audio track corresponding to the detected media file transition trigger and associate the obtained timecode with the metadata of the second media file to link the second media file with the identified audio sample. The processor is further configured to generate a synchronized multimedia file having the linked second media file with the identified audio sample.

FIG. 1 illustrates an environment 100 implementing an exemplary synchronization system 102 in accordance with various embodiments. The synchronization system 102 is configured to synchronize a plurality of media files with one or more audio tracks to generate a synchronized multimedia file. For example, the media file includes, but is not limited to, one or more of an image, a video, a Graphic Interchange Format (GIF), or the like and the audio track includes, but is not limited to, a soundtrack, such as a narration, a song, or the like, having a plurality of audio samples. In accordance with various embodiments, each audio sample corresponds to a unique portion of the audio track. Further, the synchronized multimedia file corresponds to a multimedia file having one or more of the plurality of media files synchronized with a corresponding unique audio sample of the one or more audio tracks.

In addition to the synchronization system 102, the environment 100 also includes one or more user devices 104, such as, 104-1, 104-2 . . . 104-n, communicating with the synchronization system 102 over a communication network. Although not shown, a person skilled in the art would appreciate that the communication network may include, but not limited to, a wide area network (WAN) (for example, a transport control protocol/internet protocol (TCP/IP) based network), a cellular network, or a local area network (LAN) employing any of a variety of communications protocols as is well known in the art.

Each of the one or more user devices 104, such as, 104-1, 104-2 . . . 104-n, operates as an interface for a corresponding user interacting with the synchronization system 102. Each user utilizes the respective user device 104 to provide one or more inputs, such as, but not limited to, the plurality of media files and the one or more audio tracks, and receive one or more outputs, such as, but not limited to, the synchronized multimedia file, from the synchronization system 102. Each user device 104 includes a plurality of electrical and electronic components, providing power, operational control, communication, and the like within the user device 104. The various components of the user device 104 will now be described with reference to FIG. 2.

Figure 2:
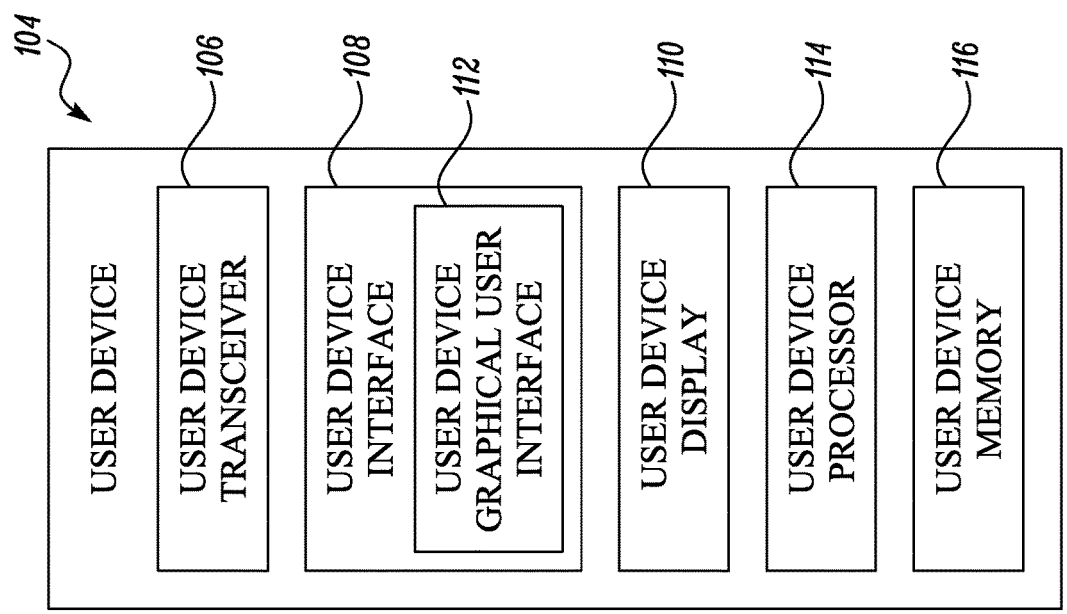
FIG. 2 illustrates a block diagram of an exemplary user device, in accordance with some embodiments.

It should be appreciated by those of ordinary skill in the art that FIG. 2 depicts the user device 104 in a simplified manner and a practical embodiment may include additional components and suitably configured logic to support known or conventional operating features that are not described in detail herein. It will further be appreciated by those of ordinary skill in the art that the user device 104 is a personal computer, desktop computer, tablet, smartphone, or any other computing device now known or developed in the future. Further, although the user device 104 is shown and described to be implemented within a single computing device, it may be contemplated that the one or more components of the user device 104 may alternatively be implemented in a distributed computing environment, without deviating from the scope of the claimed subject matter. It will further be appreciated by those of ordinary skill in the art that the user device 104 alternatively may function within a remote server, cloud computing device, or any other local or remote computing mechanism now known or developed in the future.

The user device 104 includes, among other components, a user device transceiver 106, a user device interface 108, a user device display 110, a user device processor 114, and a user device memory 116. The components of the user device 104, including the user device transceiver 106, the user device interface 108, the user device display 110, the user device processor 114, and the user device memory 116, cooperate with one another to enable operations of the user device 104. Each component may communicate with one another via a local interface (not shown). The local interface may be, for example, but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

As illustrated, the user device 104 in the exemplary embodiment includes the user device transceiver 106 to provide the one or more inputs to and receive the one or more outputs from the synchronization system 102. The user device transceiver 106 includes a transmitter circuitry and a receiver circuitry to enable the user device 104 to communicate data to and acquire data from other devices such as the synchronization system 102. In this regard, the transmitter circuitry includes appropriate circuitry to provide the one or more inputs, such as, but not limited to, the plurality of media files and the one or more audio tracks, to the synchronization system 102. Similarly, the receiver circuitry includes appropriate circuitry to receive the one or more outputs, such as, but not limited to, the synchronized multimedia file and one or more instructions associated with the generation of the synchronized multimedia file from the synchronization system 102. It will be appreciated by those of ordinary skill in the art that the user device 104 may include a single user device transceiver 106 as shown, or alternatively separate transmitting and receiving components, for example but not limited to, a transmitter, a transmitting antenna, a receiver, and a receiving antenna.

The user device interface 108 is configured to receive user input from and/or to provide system output to the user or to one or more user devices or components. User input may be provided via, for example, a keyboard, a touch screen display (such as, the user device display 110), a camera, a touch pad, a microphone, a recorder, and/or a mouse or any other user input mechanism now known or developed in the future. System output may be provided via a display device, such as the user device display 110, speakers, a speaker, a haptic output, or any other output mechanism now known or developed in the future. The user device interface 108 may further include, for example, a serial port, a parallel port, an infrared (IR) interface, a universal serial bus (USB) interface and/or any other interface herein known or developed in the future.

In some embodiments, the user device interface 108 includes a user device graphical user interface 112 (as also shown in FIG. 1) through which the user communicates to and from the synchronization system 102. The user device graphical user interface 112 may be an application or web portal or any other suitable interface to generate the synchronized multimedia file now known or developed in the future. The user device graphical user interface 112 includes one or more of graphical elements associated with the generation of the synchronized multimedia file. The graphical elements may include, but is not limited to one or more of graphical icons, control buttons, timelines, selection boxes, progress indicators, pull-down menus, on-off checkmarks, scroll bars, windows, window edges, toggle buttons, and/or forms. The graphical elements may be used in conjunction with text to prompt the user for an input, respond to user actions, or display information to the user in response to the one or more instructions from the synchronization system 102.

The user device display 110 is configured to display data, images, and the like. The user device display 110 includes, for example, any display screen or a computer monitor now known or developed in the future. In accordance with some embodiments, the user device display 110 is configured to display the user device graphical user interface 112 associated with the generation of the synchronized multimedia file.

The user device memory 116 is a non-transitory memory configured to store a set of instructions that are executable by the user device processor 114 to perform predetermined operations. For example, the user device memory 116 may include any of the volatile memory elements (for example, random access memory (RAM), nonvolatile memory elements (for example, read only memory (ROM)), and combinations thereof. Moreover, the user device memory 116 may incorporate electronic, magnetic, optical, and/or other types of storage media. In some embodiments, the user device memory 116 is also configured to store files, such as but not limited to, the plurality of media files, the one or more audio tracks, and the synchronized multimedia file.

The user device processor 114 is configured to execute the instructions stored in the user device memory 116 to perform the predetermined operations, for example the detailed functions of the user device 104 as will be described hereinafter. The user device processor 114 may include one or more microprocessors, microcontrollers, DSPs (digital signal processors), state machines, logic circuitry, or any other device or devices that process information or signals based on operational or programming instructions. The user device processor 114 may be implemented using one or more controller technologies, such as Application Specific Integrated Circuit (ASIC), Reduced Instruction Set Computing (RISC) technology, Complex Instruction Set Computing (CISC) technology or any other similar technology now known or in the future developed. The user device processor 114 is configured to cooperate with other components of the user device 104 to perform operations pursuant to communications and the one or more instructions from the synchronization system 102.

Referring back to FIG. 1, the synchronization system 102 is configured to obtain the plurality of media files and the one or more audio tracks from the user device 104 and generate the synchronized multimedia file. The synchronization system 102 may be electrically and/or communicatively connected to a variety of devices, such as, the user device 104. In some embodiments, the synchronization system 102 includes a plurality of electrical and electronic components, providing power, operational control, communication, and the like within the synchronization system 102. For example, the synchronization system 102 includes, among other things, a synchronization system transceiver 120, a synchronization system processor 124, and a synchronization system memory 126.

It should be appreciated by those of ordinary skill in the art that FIG. 1 depicts the synchronization system 102 in a simplified manner and a practical embodiment may include additional components and suitably configured logic to support known or conventional operating features that are not described in detail herein. It will further be appreciated by those of ordinary skill in the art that the synchronization system 102 may be a personal computer, desktop computer, tablet, smartphone, or any other computing device now known or developed in the future.

Further, although the synchronization system 102 is shown and described to be implemented within a single computing device, it may be contemplated that the one or more components of the synchronization system 102 may alternatively be implemented in a distributed computing environment, without deviating from the scope of the claimed subject matter. It will further be appreciated by those of ordinary skill in the art that the synchronization system 102 alternatively may function within a remote server, cloud computing device, or any other remote computing mechanism now known or developed in the future. For example, the synchronization system 102 in some embodiments may be a cloud environment incorporating the operations of the synchronization system transceiver 120, the synchronization system processor 124, and the synchronization system memory 126, and various other operating modules to serve as a software as a service model for the user devices 104. In some embodiments, the synchronization system 102 and the user device 104 may be implemented in a single device to perform the functions of both the synchronization system 102 and the user device 104, as will be described hereinafter.

The components of the synchronization system 102, including the synchronization system transceiver 120, the synchronization system processor 124, and the synchronization system memory 126 may communicate with one another via a local interface (not shown). The local interface may be, for example, but not limited to, one or more buses or other wired or wireless connections, as is known in the art. The local interface may have additional elements, but not limited to, such as controllers, buffers (caches), drivers, repeaters, and receivers, among many others, to enable communications. Further, the local interface may include address, control, and/or data connections to enable appropriate communications among the aforementioned components.

The synchronization system transceiver 120 includes a transmitter circuitry and a receiver circuitry (not shown) to enable the synchronization system 102 to communicate data to and acquire data from other devices such as the user devices 104. In this regard, the transmitter circuitry may include appropriate circuitry to transmit data such as, but not limited to, the synchronized multimedia files and the one or more instructions associated with the generation of the synchronized multimedia file to the user device 104. Similarly, the receiver circuitry may include appropriate circuitry to receive data such as, but not limited to, the plurality of media files and the one or more audio tracks from the user device 104. The transmitter circuitry and the receiver circuitry together form a wireless transceiver to enable wireless communication with the user device 104. It will be appreciated by those of ordinary skill in the art that the synchronization system 102 may include a single synchronization system transceiver 120 as shown, or alternatively separate transmitting and receiving components, for example but not limited to, a transmitter, a transmitting antenna, a receiver, and a receiving antenna.

The synchronization system memory 126 is a non-transitory memory configured to store a set of instructions that are executable by the synchronization system processor 124 to perform the predetermined operations. For example, the synchronization system memory 126 may include any of the volatile memory elements (for example, random access memory (RAM), nonvolatile memory elements (for example read only memory (ROM)), and combinations thereof. Moreover, the synchronization system memory 126 may incorporate electronic, magnetic, optical, and/or other types of storage media. In some embodiments, the synchronization system memory 126 is also configured to store files, such as, but not limited to, the plurality of media files, the one or more audio tracks, and the synchronized multimedia file.

The synchronization system processor 124 is configured to execute the instructions stored in the synchronization system memory 126 to perform the predetermined operations, for example the detailed functions of the synchronization system 102 as will be described hereinafter. The synchronization system processor 124 may include one or more microprocessors, microcontrollers, DSPs (digital signal processors), state machines, logic circuitry, or any other device or devices that process information or signals based on operational or programming instructions. The synchronization system processor 124 may be implemented using one or more controller technologies, such as Application Specific Integrated Circuit (ASIC), Reduced Instruction Set Computing (RISC) technology, Complex Instruction Set Computing (CISC) technology or any other similar technology now known or in the future developed.

In operation, the synchronization system 102 is configured to obtain the plurality of media files from the user device 104, such as, via the synchronization system transceiver 120. In an embodiment, the synchronization system 102 may transmit a request to the user device 104 to provide the plurality of media files to the synchronization system 102. In an exemplary embodiment, the request may also include one or more instructions to prompt the user, for example via one or more graphical elements on the user device graphical user interface 112, to provide the plurality of media files. Upon receiving the request, the user device 104 is configured to obtain the plurality of media files from the user. In an exemplary embodiment, the user device 104 is configured to obtain the plurality of media files when the user selects the one or more graphical elements on the user device graphical user interface 112. The user device 104 is further configured to provide the obtained plurality of media files to the synchronization system 102. In another embodiment, the synchronization system 102 is configured to receive a signal from the user device 104 notifying transmission of the plurality of media files from the user device 104 to the synchronization system 102. Upon receiving the signal, the synchronization system 102 is configured to obtain the plurality of media files from the user device 104. In accordance with various embodiments, the user device 104 is configured to obtain the plurality of media files from the user device memory 116, based on the selection of the user. In some embodiments, the user device 104 is configured to capture the plurality of media files, for example via a camera within or communicatively coupled to the user device 104. In accordance with various embodiments, the synchronization system 102 is configured to provide one or more instructions to the user device 104 to display the obtained plurality of media files on the user device graphical user interface 112.

In some embodiments, the plurality of media files are arranged in a predefined media order. In accordance with various embodiments, the predefined media order corresponds to a sequence for viewing the plurality of media files in the synchronized multimedia file. In an embodiment, the synchronization system 102 may provide one or more instructions to the user device 104 to prompt the user, for example, via one or more graphical elements on the user device graphical user interface 112, to arrange the plurality of media files in the predefined media order. In an exemplary embodiment, the one or more graphical elements may include a media timeline onto which the user can drag and drop the media files to arrange the media files in the predefined media order. Upon receiving the instructions, the user device 104 is configured to obtain the plurality of media files arranged in the predefined media order from the user. In an exemplary embodiment, the user device 104 is configured to obtain the plurality of media files in the predefined media order by enabling the user to drag and drop the media files onto the one or more graphical elements, such as, the media timeline, in the predefined media order. The user device 104 is configured to transmit the plurality of media files arranged in the predefined media order to the synchronization system 102. In another embodiment, the synchronization system 102 is configured to receive a signal from the user device 104 notifying transmission of the plurality of media files arranged in the predefined media order from the user device 104 to the synchronization system 102. Upon receiving the signal, the synchronization system 102 is configured to obtain the plurality of media files arranged in the predefined media order from the user device 104.

In accordance with various embodiments, each of the plurality of media files is associated with a metadata representing unique identification of the corresponding media file. The metadata includes, but is not limited to, a serial number, a file number, and/or any unique identification, of the corresponding media file. In accordance with some embodiments, the synchronization system 102 is configured to obtain the metadata corresponding to each of the plurality of media files from the user device 104, such as, via the synchronization system transceiver 120. To this end, in an embodiment, the synchronization system 102 may provide a request to the user device 104 to provide the metadata corresponding to each of the plurality of media files. Upon receiving the request, the user device 104 is configured to obtain the metadata corresponding to each of the plurality of media files stored in the user device memory 116. In another embodiment, the synchronization system 102 is configured to receive a signal from the user device 104 notifying transmission of the metadata corresponding to each of the plurality of media files from the user device 104 to the synchronization system 102. Upon receiving the signal, the synchronization system 102 is configured to obtain the metadata corresponding to each of the plurality of media files from the user device 104. In accordance with some embodiments, when the plurality of media files are captured by the user device 104, the user device 104 is configured to generate the metadata corresponding to each of the plurality of media files and store the generated metadata in the user device memory 116. In some other embodiments, when the plurality of media files are received by the user device 104 from another device, the user device 104 is configured to receive the metadata corresponding to each of the plurality of media files and store the received metadata in the user device memory 116. The user device 104 is further configured to transmit the metadata corresponding to each of the plurality of media files to the synchronization system 102. In some embodiments, the synchronization system 102 is configured to store the metadata corresponding to each of the plurality of media files in the synchronization system memory 126.

Although not described in detail, it will be appreciated that the synchronization system 102 may be configured to obtain the plurality of media files and the associated metadata from two or more user devices 104 to enable the respective two or more users to collaborate for creation of the synchronized multimedia file. For example, a first set of media files and the metadata corresponding to the first set of media files may be obtained from a first user device 104-1 and a second set of media files and the metadata corresponding to the second set of media files may be obtained from a second user device 104-2.

The synchronization system 102 is further configured to obtain the one or more audio tracks including a plurality of audio samples from the user device 104, such as, via the synchronization system transceiver 120. In accordance with various embodiment, each audio sample may correspond to a unique portion of the audio track. In an embodiment, the synchronization system 102 may transmit a request to the user device 104 to provide the one or more audio tracks to the synchronization system 102. In an exemplary embodiment, the request may also include one or more instructions to prompt the user, for example via one or more graphical elements on the user device graphical user interface 112, to provide the one or more audio tracks to the synchronization system 102. Upon receiving the request, the user device 104 is configured to obtain the one or more audio tracks from the user. In an exemplary embodiment, the user device 104 is configured to obtain the one or more audio tracks when the user selects the one or more graphical elements on the user device graphical user interface 112. In another embodiment, the synchronization system 102 is configured to receive a signal from the user device 104 notifying transmission of the one or more audio tracks from the user device 104 to the synchronization system 102. Upon receiving the signal, the synchronization system 102 is configured to obtain the one or more audio tracks from the user device 104. In accordance with various embodiments, the user device 104 is configured to obtain the one or more audio tracks from the user device memory 116, based on the selection of the user. In some embodiments, the user device 104 is configured to record the one or more audio tracks, such as a narration, for example via a microphone or a recorder within or communicatively coupled to the user device. The user device 104 is further configured to provide the obtained plurality of media files to the synchronization system 102. In some embodiments, the synchronization system 102 is configured to provide one or more options to the user for example on the user device graphical user interface 112, to select one or more prerecorded audio tracks stored in the synchronization system 102 as the one or more audio tracks. In such cases, the user device 104 is configured to communicate the selection to the synchronization system 102. In some embodiments, the synchronization system 102 is configured to provide one or more instructions to the user device 104 to display waveform(s) associated with the obtained one or more audio tracks on the user device graphical user interface 112.

In some embodiments, when there are a plurality of audio tracks, the synchronization system 102 is configured to obtain the plurality of audio tracks arranged in a predefined audio track order. In accordance with various embodiments, the predefined audio track order corresponds to a sequence for playing the one or more audio tracks in the synchronized multimedia file. In an embodiment, the synchronization system 102 may provide one or more instructions to the user device 104 to prompt the user, for example via one or more graphical elements on the user device graphical user interface 112, to arrange the plurality of audio tracks in the predefined audio track order. In an exemplary embodiment, the one or more graphical elements may include an audio timeline onto which the user can drag and drop the waveforms associated with the audio tracks to arrange the audio tracks in the predefined audio track order. Upon receiving the instructions, the user device 104 is configured to obtain the plurality of audio tracks arranged in the predefined audio track order from the user. In an exemplary embodiment, the user device 104 is configured to obtain the plurality of audio tracks arranged in the predefined audio track order by enabling the user to drag and drop the waveforms associated with the audio tracks onto the one or more graphical elements, such as, the audio timeline, in the predefined audio track order. The user device 104 is further configured to transmit the plurality of audio tracks arranged in the predefined audio track order to the synchronization system 102. In another embodiment, the synchronization system 102 is configured to receive a signal from the user device 104 notifying transmission of the plurality of audio tracks arranged in the predefined audio track order from the user device 104 to the synchronization system 102. Upon receiving the signal, the synchronization system 102 is configured to obtain the audio tracks arranged in the predefined audio track order from the user device 104.

In accordance with various embodiments, each of the plurality of audio samples is indexed with a corresponding timecode. The timecode may be any standard timecode, such as Society of Motion Picture and Television Engineers (SMPTE) time code or the like. In some embodiments, the synchronization system 102 is configured to obtain the timecode associated with each audio sample from the user device 104, such as, via the synchronization system transceiver 120. In an embodiment, the synchronization system 102 may provide a request to the user device 104 to provide the timecode associated with each audio sample. Upon receiving the request, the user device 104 is configured to obtain the timecode associated with each audio sample stored in the user device memory 116. In another embodiment, the synchronization system 102 is configured to receive a signal from the user device 104 notifying transmission of the timecode associated with each audio sample from the user device 104 to the synchronization system 102. Upon receiving the signal, the synchronization system 102 is configured to obtain the timecode associated with each audio sample from the user device 104. In accordance with some embodiments, when the user device 104 is configured to record the one or more audio tracks, the user device 104 is configured to index each audio sample of the one or more audio tracks with the timecode and store the indexed timecodes in the user device memory 116. The user device 104 is further configured to transmit the timecode associated with each audio sample to the synchronization system 102. In some embodiments, the synchronization system 102 is configured to store the timecode associated with each audio sample in the synchronization system memory 126. In some embodiments, when the one or more audio tracks corresponds to the one or more prerecorded audio tracks stored in the synchronization system 102, the synchronization system 102 is configured to obtain the timecode associated with each audio sample of the one or more prerecorded audio tracks from the synchronization system memory 126.

Although not described in detail, it will be appreciated that the synchronization system 102 may be configured to obtain the plurality of audio tracks and the timecode from two or more user devices 104 to enable the respective two or more users to collaborate for creation of the synchronized multimedia file. For example, a first audio track and the timecode associated with each audio sample of the first audio track may be obtained from the first user device 104-1 and a second audio track and the timecode associated with each audio sample of the second audio track may be obtained from the second user device 104-2.

The synchronization system 102, for example via the synchronization system processor 124, is further configured to detect, while an audio track is being played, a media file transition trigger. In accordance with various embodiments, the media file transition trigger identifies a current audio sample of the audio track as an audio sample to transition from a first media file to a second media file of the plurality of media files. In accordance with various embodiments, the media file transition trigger may include one or a combination of a key press, a screen touch, a mouse click, a selection of graphical element, or any trigger now known or developed in the future, provided by the user on the user device 104.

To this end, the synchronization system 102 is first configured to determine whether an audio track of the one or more audio tracks is being played by the user on the user device 104. In some embodiments, the synchronization system 102 is configured to communicate with the user device 104 to determine whether the audio track is being played by the user on the user device 104. In an exemplary embodiment, the synchronization system 102 is configured to instruct the user device 104 to provide user request associated with the playback of the audio track to the synchronization system 102. In accordance with various embodiments, the user request may include selection of one or more graphical elements, on the user device graphical user interface 112, associated with the playback of the one or more audio tracks. Upon receiving the user request, the user device 104 is configured to provide the user request to the synchronization system 102. The synchronization system 102 is then configured to control the user device 104 to play the audio track, for example, via the speaker. In accordance with various embodiments, the synchronization system 102 is configured to communicate with the user device 104 to determine that the audio track is being played when the user device 104 starts playing the audio track. In some embodiments, the synchronization system 102 is configured to communicate with the user device 104 to maintain track of the audio samples that are being played at the user device 104, at various time instances.

In accordance with various embodiments, the synchronization system 102 is configured to consider the user request to play the audio track as a trigger that the user chooses to initiate a synchronization process. To this end, the synchronization system 102 is configured to instruct the user device 104 to display one or more media files, from the plurality of media files, for example via the user device graphical user interface 112 on the user device 104, when the audio track is being played. In an exemplary embodiment, the one or more media files may include the first media file and the second media file. Generally, the first media file corresponds to a media file (interchangeably referred to as current media file) that is synchronized to be displayed with the current audio samples that are being played and the second media file corresponds to a next media file that is yet to be synchronized with any audio sample. In accordance with the various embodiments, the synchronization system 102 is configured to identify the first media file and the second media file based on various stages of the synchronization process, as described in detail hereinafter. In an exemplary embodiment, at the start of the synchronization process, the first media file may correspond to a media file arranged at a first position in the predefined media order and the second media file may be a subsequent media file arranged at a second position in the predefined media order.

In accordance with various embodiments, the synchronization system 102 is configured to detect the media file transition trigger while the audio track is being played. To this end, the synchronization system 102 is configured to communicate with the user device 104, to detect the media file transition trigger. The synchronization system 102 is configured to instruct the user device 104, to detect the media file transition trigger received by the user device 104 while the audio track is being played and communicate the detection to the synchronization system 102. The synchronization system 102 is then configured to identify an audio sample of the audio track that is being played (hereinafter interchangeably referred to as the current sample) when the media file transition trigger is detected.

In accordance with various embodiments, the synchronization system 102, for example via the synchronization system processor 124, is configured to obtain the timecode indexed with the identified audio sample of the audio track corresponding to the detected media file transition trigger. The synchronization system 102 is also configured to obtain the metadata of the second media file displayed on the user device 104 when the media file transition trigger is detected. The synchronization system 102 may be configured to obtain the timecode indexed with the identified audio sample and the metadata of the second media file from the synchronization system memory 126. In accordance with various embodiments, the synchronization system 102, for example via the synchronization system processor 124, is configured to associate the obtained timecode with the metadata of the second media file to link the second media file with the identified audio sample. In some embodiments, the synchronization system 102 is configured to store the association in the synchronization system memory 126.

In an exemplary embodiment, at the start of the synchronization process, when the first media file corresponds to the media file arranged at the first position in the predefined media order and the second media file corresponds to the subsequent media file arranged at the second position in the predefined media order, the synchronization system 102 is configured to detect a first media file transition trigger and identify an audio sample, for example audio sample 1 (not shown), that is being played when the first media file transition trigger is detected. In such cases, the synchronization system 102 is configured to identify the first media file transition trigger as a trigger to transition from the media file arranged at the first position in the predefined media order (in this scenario, the first media file) to the media file arranged at the second position in the predefined media order (in this scenario, the second media file). Accordingly, the synchronization system 102 is configured to link the media file arranged at the second position in the predefined media order (i.e., the second media file) with the identified audio sample 1 by associating the timecode of the audio sample 1 with the metadata of the media file arranged at the second position in the predefined media order.

Once the media file arranged at the second position in the predefined media order is linked with the audio sample 1, the synchronization system 102 is configured to communicate with the user device 104 to identify a second media transition trigger. At this stage, the synchronization system 102 is configured to identify the first media file as the media file arranged at the second position in the predefined media order and the second media file as a media file arranged at the third position in the predefined media order. The synchronization system 102 is then configured to detect the second media file transition trigger and identify an audio sample, for example, audio sample 2 (not shown), that is being played when the second media file transition trigger is detected. In such cases, the synchronization system 102 is configured to identify the second media file transition trigger as a trigger to transition from the media file arranged at the second position in the predefined media order (in this scenario, the first media file) to the media file arranged at the third position in the predefined media order (in this scenario, the second media file). Accordingly, the synchronization system 102 is configured to link the media file arranged at the third position in the predefined media order (i.e., the second media file) with the audio sample 2 by associating the timecode of the identified audio sample 2 with the metadata of the media file arranged at the third position in the predefined media order. In accordance with various embodiments, the synchronization system 102 is configured to perform the above steps until each of the plurality of media files is associated with a desired corresponding audio sample of the one or more audio tracks.

In accordance with various embodiments, the synchronization system 102 such as, via the synchronization system processor 124, is configured to generate the synchronized multimedia file having the linked second media file with the identified audio sample. In accordance with various embodiments, the generated synchronized multimedia file links or associates the metadata of the second media file with the timecode of the identified audio sample such that the second media file is displayed when the identified audio sample is played and vice-versa, during the replay of the synchronized multimedia file. Particularly, the association of the metadata of the second media file with the timecode of the identified audio sample, synchronizes the display of the second media file with the identified audio sample, every time the synchronized multimedia file is played. The synchronization system 102 is configured to transmit the generated synchronized multimedia file to the one or more user devices 104. Upon receiving the synchronized multimedia file, the user device 104 is configured to provide the user with an option, such as, via the user device graphical user interface 112, to play and/or store the received synchronized multimedia file. In some embodiments, the user device 104 is also configured to transmit the received synchronized multimedia file to other user devices 104, such as, via the user device transceiver 106. In some embodiments, the synchronization system 102 is configured to store the generated synchronized multimedia file in a collaborative storage means such as, but not limited to, on the cloud or a web portal or a social media account to enable the user to share the generated synchronized multimedia file with other user devices 104.

In accordance with some embodiments, the synchronization system 102 is configured to receive one or more edits to the plurality of media file such as, via the synchronization system transceiver 120. In accordance with various embodiments, the one or more edits to the plurality of media file are received before and/or during the synchronization process. The one or more edits may correspond to one or more of changing the predefined order of the plurality of media files, adding new media file, and deleting a media file from the plurality of media files. To this end, the synchronization system 102 is configured to provide one or more instructions to the user device 104 to allow the user to edit the plurality of media files on the user device 104, before and/or during the synchronization process. The synchronization system 102 may instruct the user device 104 to display one or more graphical elements, for example, the media timeline, via the user device graphical user interface 112 to enable the user to edit the plurality of media files. Upon receiving the instructions, the user device 104 is configured to receive the one or more edits to the plurality of media files from the user. The user device 104 is then configured to communicate the one or more edits to the synchronization system 102. In another embodiment, the synchronization system 102 is configured to receive a signal from the user device 104 notifying transmission of the one or more edits to the plurality of media files from the user device 104 to the synchronization system 102. Upon receiving the signal, the synchronization system 102 is configured to obtain the one or more edits from the user device 104. In an exemplary embodiment, the user device 104 is configured to receive the one or more edits when the user makes edits, such as but not limited to, changes the predefined order of the plurality of media files, adds a new media file, and deletes a media file from the plurality of media files, on the media timeline. In some embodiments, the user device 104 enables the user to make edits on the media timeline by using the drag and drop method. In some embodiments, when two or more user devices 104 are collaborating for creation of the synchronized multimedia file, the synchronization system 102 may be configured to receive the edits from one or more of the two or more user devices 104. Upon receiving the one or more edits, the synchronization system 102 is configured to update such as, via the synchronization system processor 124, the plurality of media files, for example, stored in the synchronization system memory 126, to reflect the received one or more edits.

In some embodiments, the synchronization system 102 is configured to communicate with the user device 104 to determine whether the audio track is paused by the user on the user device 104 during the synchronization process. In an exemplary embodiment, the synchronization system 102 is configured to instruct the user device 104 to provide user request associated with the pausing of the audio track to the synchronization system 102. In accordance with various embodiments, the user request may include selection of one or more graphical elements, on the user device graphical user interface 112, associated with the pausing of the one or more audio tracks. Upon receiving the user request, the user device 104 is configured to provide the user request associated with the pausing to the synchronization system 102. The synchronization system 102 is then configured to communicate with the user device 104 to pause the audio track and wait for further inputs from the user. In accordance with various embodiments, pausing the audio track corresponds to pausing the synchronization process. In an exemplary embodiment, the synchronization system 102 is configured to communicate with the user device 104 to display the one or more graphical elements, for example, the media timeline, to enable the user to edit the plurality of media files, when the synchronization process is paused.

In some embodiments, the synchronization system 102 is configured to provide one or more instructions to the user device 104 to allow the user to restart the synchronization process. In an exemplary embodiment, the synchronization system 102 is configured to provide one or more instructions to the user device 104 to display one or more graphical elements, for example, via the user device graphical user interface 112, to restart the synchronization process. In accordance with some embodiments, the one or more graphical elements to restart the synchronization process are displayed upon receiving the one or more edits to the media files or anytime during the synchronization process. The synchronization system 102 is further configured to provide one or more instructions to the user device 104 to communicate a user request to restart the synchronization process to the synchronization system 102. In an exemplary embodiment, the user request may include selection of the one or more graphical elements to restart the synchronization process. Upon receiving the one or more instructions, the user device 104 is configured to transmit the user request to the synchronization system 102. The synchronization system 102 is then configured to restart the synchronization process and delete any previous associations of the metadata of the media files with any audio sample.

In some embodiments, when the one or more edits are associated with the media files that are yet to be linked to any audio sample, the user may also decide to resume the synchronization process instead of restarting. To this end, the synchronization system 102 is configured to provide one or more instructions to the user device 104 to allow the user to resume the synchronization process. In an exemplary embodiment, the synchronization system 102 is configured to provide one or more instructions to the user device 104 to display one or more graphical elements, for example, via the user device graphical user interface 112, to resume the synchronization process. In accordance with some embodiments, the one or more graphical elements to resume the synchronization process are displayed upon receiving the one or more edits to the media files. The synchronization system 102 is further configured to provide one or more instructions to the user device 104 to communicate user request to resume the synchronization process to the synchronization system 102. In an exemplary embodiment, the user request may include selection of the one or more graphical elements to resume the synchronization process.

The synchronization system 102 is further configured to receive a further media file transition trigger to associate one or more of the updated plurality of media files with one or more of the plurality of audio samples of the audio track, such as, via the synchronization system processor 124. In accordance with various embodiments, the further media file transition trigger is received when the synchronization process is resumed or restarted. The synchronization system 102 is further configured to associate, for example, via the synchronization system processor 124, the one or more of the updated plurality of media files with the one or more of the plurality of audio samples based on the received trigger, using the synchronization process as described in the foregoing disclosure.

In accordance with various embodiments, when there are a plurality of audio tracks, for example, a first audio track and a second audio track, the user may wish to transition from the first audio track to the second audio track, to associate one or more of the remaining plurality of media files with one or more of the plurality of audio samples of the second audio track (hereinafter interchangeably referred to as second audio samples). To this end, the synchronization system 102, for example, via the synchronization system processor 124 is configured to communicate with the user device 104 to detect an audio track transitioning trigger to associate one or more of the remaining plurality of media files with one or more of the plurality of second audio samples. In accordance with various embodiments, the audio track transitioning trigger indicates that the user chooses to associate the one or more of the remaining plurality of media files with one or more of the plurality of second audio samples of the second audio track. In some embodiments, the synchronization system 102 is configured to detect the audio track transitioning trigger during the synchronization process. In accordance with various embodiments, the audio track transitioning trigger is different from the media file transition trigger and may include one or a combination of a key press, a screen touch, a mouse click, a selection of graphical element, an audio mark on the media file(s) arranged on the media timeline, or any trigger now known or developed in the future, provided by the user on the user device 104. In an exemplary embodiment, the synchronization system 102 is configured to instruct the user device 104, to detect the audio track transitioning trigger received by the user device 104 and communicate the detection to the synchronization system 102. In some embodiments, the synchronization system 102 is configured to control the user device 104 to fade out the first audio track that is currently played and start the second audio track, upon detecting the audio track transitioning trigger. The synchronization system 102 is then configured to associate the corresponding one or more of the remaining plurality of media files with the one or more of the plurality of second audio samples in response to the detected audio track transitioning trigger such as, via the synchronization system processor 124.

In accordance with various embodiments, the synchronization system 102 is configured to communicate with the user device 104 to receive user inputs such as, via the synchronization system transceiver 120, to replay the audio track. To this end, the synchronization system 102 is configured to communicate with the user device 104 to receive user inputs based on selection of the graphical element associated with the replaying of the audio track on the user device 104. The synchronization system 102 is then configured to replay the audio track on the user device 104 based on the received input. The synchronization system 102, for example, via the synchronization system processor 124, is further configured to communicate with the user device 104 to detect another media file transition trigger received on the user device 104, while the audio track is being replayed. In accordance with various embodiments, the other media file transition trigger identifies a second audio sample from the plurality of audio samples of the audio track to transition from the first media file to the second media file of the plurality of media files. In accordance with various embodiments, the second audio sample is an audio sample which is different from an audio sample previously used to transition from the first media file to the second media file, when the audio track was previously played. The synchronization system 102 for example, via the synchronization system processor 124, is further configured to obtain a timecode indexed with the second audio sample of the audio track corresponding to the other media file transition trigger and update the association of the metadata of the second media file to reflect the association of the metadata of the second media file with the obtained timecode indexed with the identified second audio sample.

In accordance with various embodiments, when the second media file is a video, the synchronization system 102 is configured to communicate with the user device 104 to receive user inputs to identify the start point of the second media file such as, via the synchronization system transceiver 120. The synchronization system 102 is configured to communicate with the user device 104 to receive user inputs, for example, via the graphical element associated with identification of the start point of the second media file, on the user device 104. In accordance with various embodiments, the identified start point of the second media file indicates a point from which the second media file starts playing when transitioned. The synchronization system 102 for example, via the synchronization system processor 124 is then configured to transition from the first media file to the second media file at the identified start point, when the media file transition trigger is received during the synchronization process.

In accordance with various embodiments, when the first media file is a video, the synchronization system 102 is configured to communicate with the user device 104 to receive user inputs to identify the end point of the first media file such as, via the synchronization system transceiver 120. In accordance with various embodiments. The synchronization system 102 is configured to communicate with the user device 104 to receive user inputs, for example, via the graphical element associated with identification of the end point of the first media file, on the user device 104. In some examples, the received input is the media file transition trigger. In accordance with various embodiments, the identified end point of the first media file indicates a point at which the first media file transitions to the second media file. The synchronization system 102 for example, via the synchronization system processor 124 is then configured to transition from the first media file to the second media file at the identified end point, when the media file transition trigger is received during the synchronization process.

In some embodiments, the synchronization system 102 is configured to communicate with the user device 104 to enable a user to add a variety of transitions and visual effects during the transition of the first media file to the second media file. To this end, the synchronization system 102 is configured to instruct the user device 104 to receive user inputs related to the transitions and the visual effects from the user and communicate the user inputs to the synchronization system. In some embodiments, the synchronization system 102 is configured to instruct the user device 104 to display one or more graphical elements for receiving the user inputs related to the transitions and the visual effects from the user. Upon receiving the instructions from the synchronization system 102, the user device 104 is configured to receive the user inputs related to the transitions and the visual effects from the user, for example, based on the selection of the one or more graphical elements for receiving the user inputs related to the transitions and the visual effects. The user device 104 is further configured to transmit the received user inputs to the synchronization system 102. The synchronization system 102 is then configured to add transitions and the visual effects to the plurality of media files, based on the received user inputs.

Figure 3:
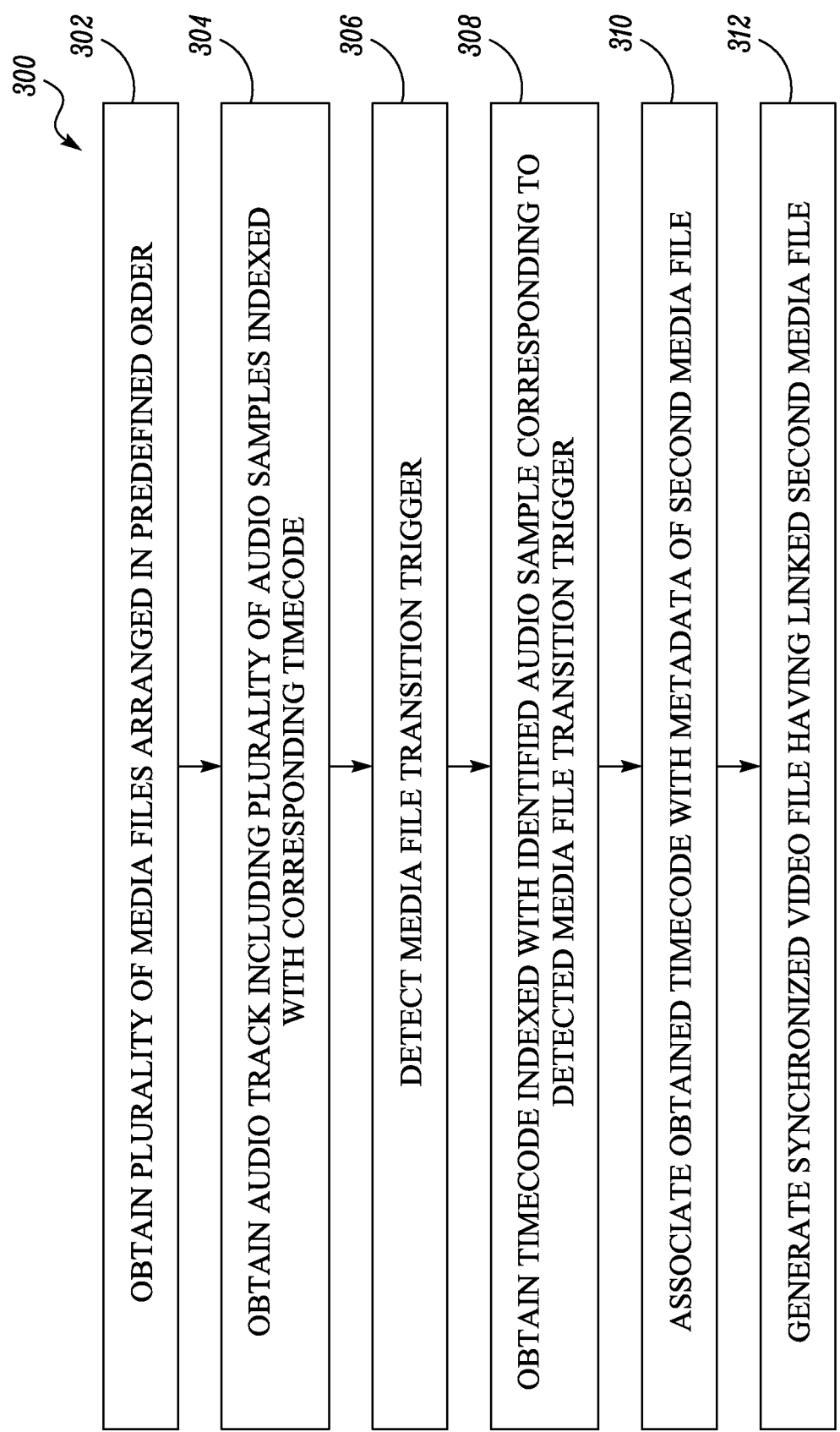
FIG. 3 illustrates an exemplary method for synchronizing the plurality of media files with the audio track, in accordance with some embodiments.

FIG. 3 illustrates a method 300 to synchronize the plurality of media files with the audio track. At 302, the method begins with the synchronization system 102 obtaining the plurality of media files arranged in the predefined order. In accordance with various embodiments, each media file is associated with the metadata representing unique identification of the corresponding media file. At 304, the synchronization system 102 obtains the audio track including the plurality of audio samples indexed with corresponding timecodes.

At 306, the synchronization system 102 detects, while the audio track is being played, the media file transition trigger that identifies the current audio sample of the audio track as an audio sample to transition from the first media file to the second media file of the plurality of media files. At 308, the synchronization system 102 obtains the timecode indexed with the identified audio sample of the audio track corresponding to the detected media file transition trigger. At 310, the synchronization system 102 associates the obtained timecode with the metadata of the second media file to link the second media file with the identified audio sample and generates the synchronized multimedia file having the linked second media file with the identified audio sample at 312.

Figure 4:
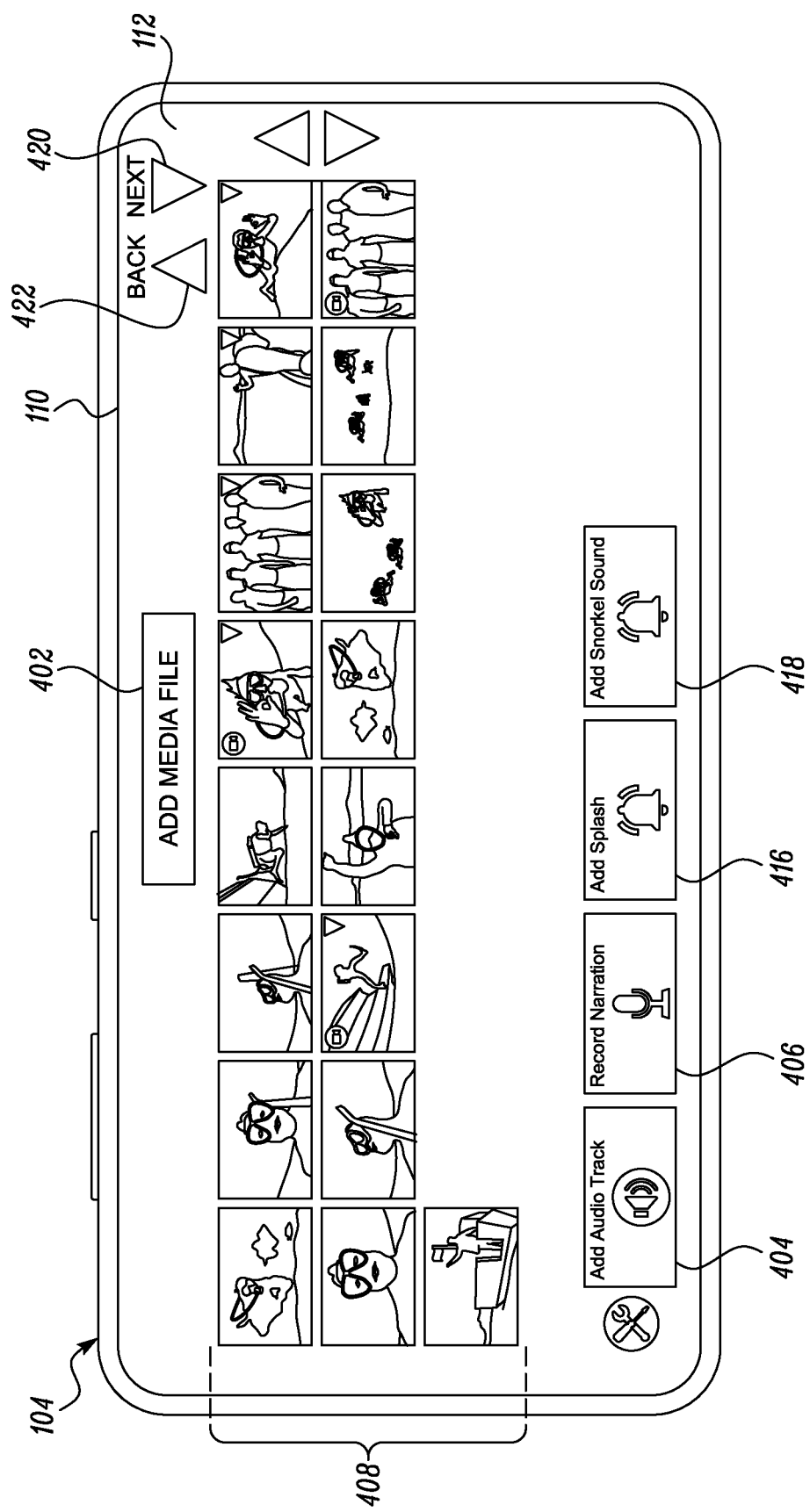
FIGS. 4 through 6 illustrate exemplary implementations for synchronizing the plurality of media files with the audio track, in accordance with some embodiments.
Figure 5:
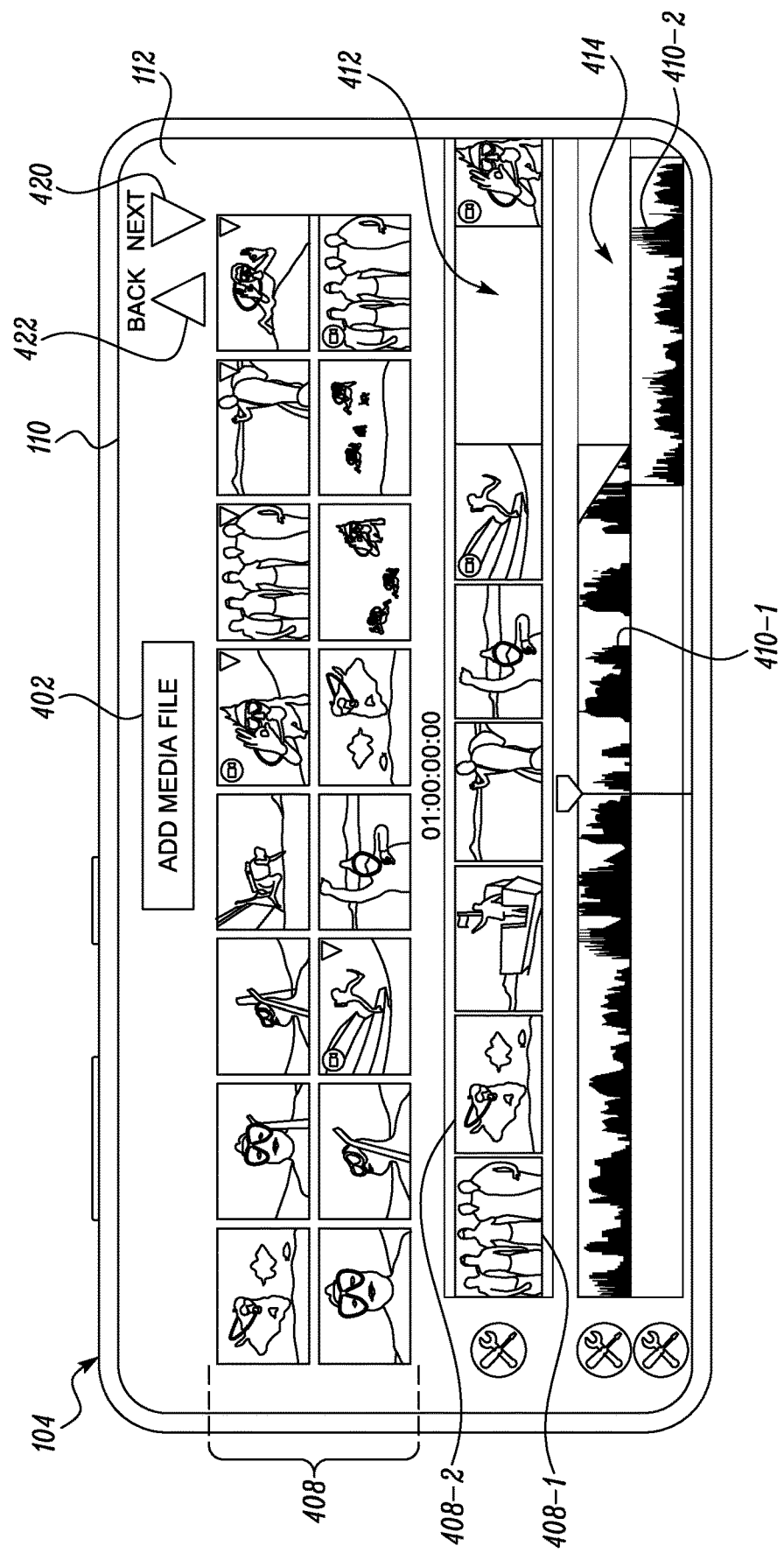
Figure 6:
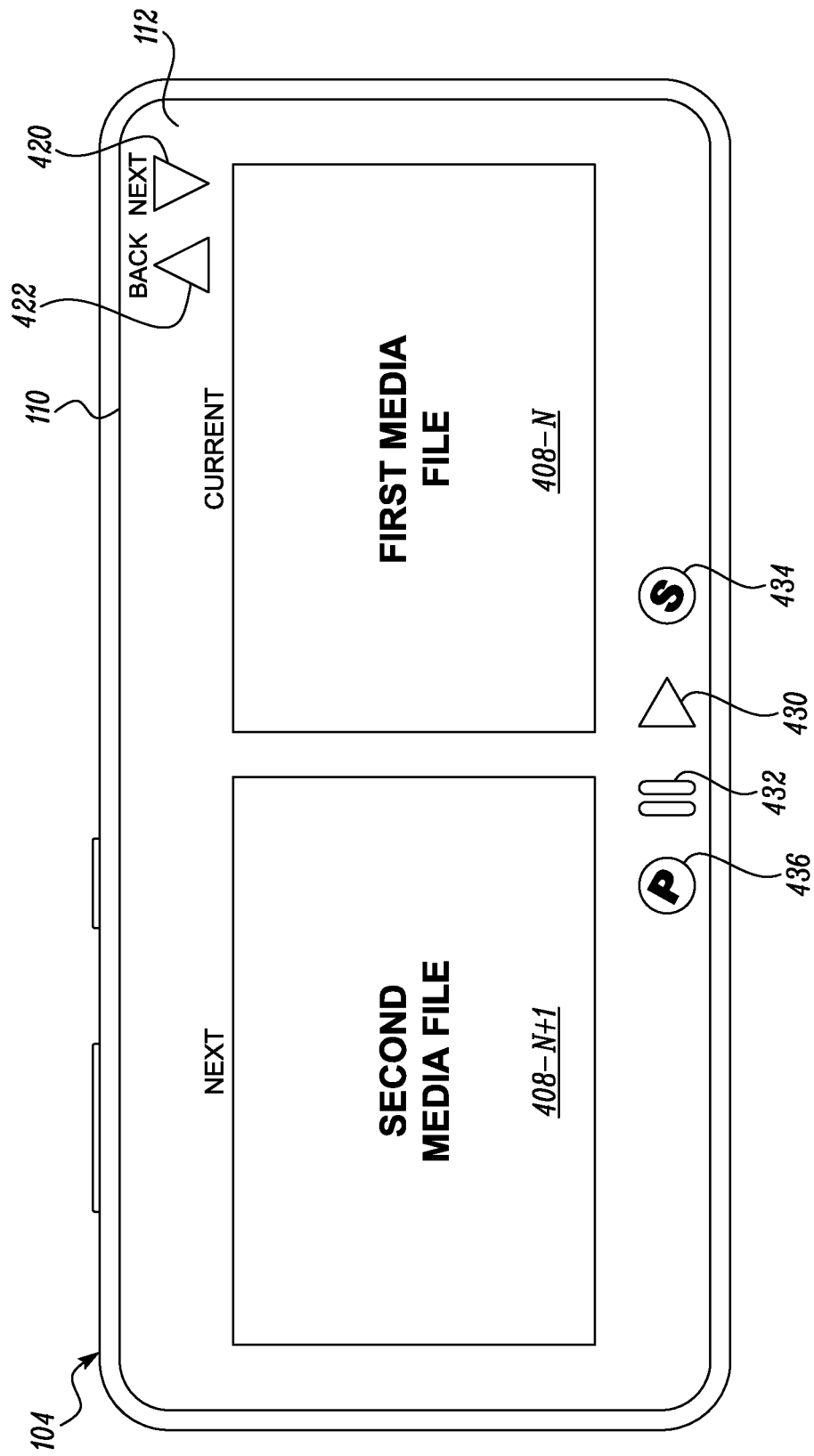

FIGS. 4 through 6 illustrate exemplary implementations for synchronizing the plurality of media files with the one or more audio tracks, in accordance with some embodiments. To this end, FIGS. 4 through 6 illustrate the user device graphical user interface 112 that is displayed on the user device display 110 of the user device 104. As discussed hereinbefore, the synchronization system 102 is configured to communicate with the user via the user device graphical user interface 112.

As illustrated in FIG. 4, the synchronization system 102 displays a plurality of graphical elements, such as but not limited to, add media file 402, add audio track 404, record narration 406, add splash 416, add snorkel sound 418 on the user device graphical user interface 112, to obtain the plurality of media files 408 and the one or more audio tracks. In accordance with various embodiments, the synchronization system 102 obtains the plurality of media files 408 via the graphical element, such as, the add media file 402. As discussed, the plurality of media files 408 can be obtained from the user device memory 116 or via the user device interface 108, such as the camera. The synchronization system 102 also displays the obtained plurality of media files 408 on the user device graphical user interface 112. Similarly, the synchronization system 102 obtains the one or more audio tracks from the user via the one or more of the graphical elements, such as, the add audio track 404, the record narration 406, the add splash 416, the add snorkel sound 418. Particularly, the synchronization system 102 obtains the one or more audio tracks from the user device memory 116 via the add audio track 404 element. In some embodiments, the synchronization system 102 obtains the one or more audio tracks recorded by the user, via the record narration 406 element. In some embodiments, the synchronization system 102 utilizes the prerecorded audio tracks upon selection of the add splash 416 and the add snorkel sound 418 elements. In some embodiments, the synchronization system 102 also displays graphical elements, such as but not limited to, next 420 and back 422 on the user device graphical user interface 112 to enable the user to navigate between a previous window or a next window of the user device graphical user interface 112.

In accordance with various embodiments, the synchronization system 102 proceeds to the next window of the user device graphical user interface 112 upon selection of the next 420 element, as illustrated in FIG. 5. The synchronization system 102 displays one or more graphical elements, such as but not limited to, a media timeline 412 and an audio timeline 414 on the next window of the user device graphical user interface 112, to assist with the arrangement of the media files and the audio tracks, respectively. In accordance with various embodiments, the media timeline 412 enables the user to arrange the plurality of media files 408 in the predefined media order, for example, 408-1, 408-2, and so on, by dragging and dropping the media files from the plurality of displayed media files 408 onto the media timeline 412 in the predefined media order. The plurality of media files 408 arranged in the predefined media order are then obtained by the synchronization system 102. Similarly, the audio timeline 414 enables the user to arrange the waveforms 410 associated with the one or more audio tracks in the predefined audio track order, for example, 410-1, 410-2, and so on. The synchronization system 102 then obtains the plurality of audio tracks arranged in the predefined audio track order.

In accordance with various embodiments, the synchronization system 102 displays the next window of the user device graphical user interface 112 upon selection of the next 420 element, as illustrated in FIG. 6. The synchronization system 102 displays graphical elements, such as 430, 432 associated with the playback of the audio track on the next window of the user device graphical user interface 112. In accordance with various embodiments, the synchronization system 102 receives the request to play and/or pause the audio track played on the user device 104 via the graphical elements 430 and/or 432, respectively. Further, as illustrated, the synchronization system 102 also displays the first media file 408-N and the second media file 408-N+1 on the user device graphical user interface 112, to assist the user with the synchronization process. Further, the synchronization system 102 also displays a graphical element 434 on the user device graphical user interface 112 to enable the user to provide the media file transition trigger. As discussed in the foregoing disclosure, the synchronization system 102 allows the user to synchronize or link a media file, such as, the second media file 408-N+1 in this example, with a desired audio sample, upon selection of the graphical element 434, while the desired audio sample is being played. In accordance with some embodiments, the synchronization system 102 also displays a graphical element 436 on the user device graphical user interface 112 to enable the user to preview the synchronized multimedia file.

The synchronization system 102 and the method 300 of the present disclosure provide a simple and an efficient solution to synchronize the plurality of media files with the one or more audio samples to create the synchronized multimedia file. By providing the media file transition trigger, which can be as simple as a screen touch, a mouse click, or a selection of a button on the display, the user can easily synchronize the media file with the desired audio sample in a hassle-free manner while the audio track is being played. This eliminates the need for dragging and adjusting the media files and/or audio samples onto various timelines to synchronize the media files with the exact desired audio samples. Particularly, the synchronization system 102 and the method 300 of the present disclosure eliminate the time-consuming and tedious process of traditional video editing with the simple trigger to create a transition between the current media file and the next media file and to synchronize to the audio track. The disclosed method is engaging and creatively rewarding compared to the traditional video editing.

Also, since the synchronization is happening in real time while the user is listening to the audio track, it becomes convenient for the user to identify and capture the exact desired audio sample that he chooses to link with the media file. Moreover, the present disclosure provides the flexibility to the user to edit the media files, pause the synchronization process, and reassociate the media files with different audio samples, even during the synchronization process. The present disclosure also provides a simple and an easy method to transition between one audio track to another audio track during the synchronization process.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A method for synchronizing a plurality of media files with an audio track, the method comprising:

obtaining the plurality of media files arranged in a predefined order, each media file associated with a metadata representing unique identification of the corresponding media file:

obtaining the audio track including a plurality of audio samples, each audio sample being indexed with a corresponding timecode;

display the plurality of media files by displaying image of a first media file and image of a second media file of the plurality of media files, for at least one set of the displayed first media file and the displayed second media file of the plurality of media files:

detecting, while the audio track is being played, a media file transition trigger, wherein the media file transition trigger identifies a current audio sample of the audio track being played as an audio sample to transition from the first media file to the second media file of the plurality of media files;

obtaining a timecode indexed with the identified audio sample of the audio track corresponding to the detected media file transition trigger:

associating the obtained timecode with the metadata of the second media file to link the second media file with the identified audio sample;

generating a synchronized multimedia file having the linked second media file with the identified audio sample;

obtaining a second audio track including a plurality of second audio samples, each second audio sample being indexed with a corresponding timecode;

playing the second audio track;

detecting, while playing the second audio track, an audio track transitioning trigger to associate one or more of the remaining plurality of media files with one or more of the plurality of second audio samples; and associating the corresponding one or more of the remaining plurality of media files with the one or more of the plurality of second audio samples in response to the detected audio track transitioning trigger.

2. The method of claim 1, wherein the media file transition trigger includes one of a key press or a screen touch.

3. The method of claim 1, further comprising:
receiving one or more edits to the plurality of media files;
updating the plurality of media files to reflect the received one or more edits;
receiving a further media file transition trigger to associate one or more of the updated plurality of media files with one or more of the plurality of audio samples of the audio track; and
associating the one or more of the updated plurality of media files with the one or more of the plurality of audio samples based on the received trigger.

4. The method of claim 3, wherein the one or more edits to the plurality of media files includes one or more of changing the predefined order of the plurality of media files, adding new media file, and deleting a media file from the plurality of media files.

5. The method of claim 1, further comprising:
receiving input to replay the audio track;
replaying the audio track based on the received input;
detecting, while the audio track is being replayed, a second media file transition trigger, the second media file transition trigger identifying a second audio sample from the plurality of audio samples of the audio track to transition from the first media file to the second media file of the plurality of media files;
obtaining a timecode indexed with the identified second audio sample of the audio track corresponding to the detected second media file transition trigger; and
updating the association of the metadata of the second media file to reflect the association of the metadata of the second media file with the obtained timecode indexed with the identified second audio sample.

6. The method of claim 1, wherein the media file comprises one or more of an image and a video.

7. The method of claim 1, wherein the second media file is a video, the method further comprises:
receiving input to identify a start point of the second media file, wherein the identified start point of the second media file indicates a point from which the second media file starts playing when transitioned; and
transitioning from the first media file to the second media file at the identified start point.

8. The method of claim 1, wherein the first media file is a video, the method further comprises:
receiving input to identify an end point of the first media file, wherein the identified end point of the first media file indicates a point at which the first media file transitions to the second media file; and
transitioning from the first media file to the second media file at the identified end point.

9. The method of claim 8, wherein the received input is the media file transition trigger.

10. A system for synchronizing a plurality of media files with an audio track, the system comprising:
a transceiver configured to:
obtain the plurality of media files arranged in a predefined order, each media file associated with a metadata representing unique identification of the corresponding media file; and obtain the audio track including a plurality of audio samples, each audio sample being indexed with a corresponding timecode;
a memory; and a processor communicatively coupled to the memory and the transceiver, wherein the memory stores instructions executable by the processor, and wherein upon execution of the stored instructions the processor is configured to:
display the plurality of media files by displaying image of a first media file and image of a second media file of the plurality of media files,
for at least one set of the displayed first media file and the displayed second media file of the plurality of media files:
detect, while the audio track is being played, a media file transition trigger, wherein the media file transition trigger identifies a current audio sample of the audio track as an audio sample to transition from the first media file to the second media file of the plurality of media files;
obtain a timecode indexed with the identified audio sample of the audio track corresponding to the detected media file transition trigger;
associate the obtained timecode with the metadata of the second media file to link the second media file with the identified audio sample;
generate a synchronized multimedia file having the linked second media file with the identified audio sample;
wherein the transceiver is further configured to:
obtain a second audio track including a plurality of second audio samples, each second audio sample being indexed with a corresponding timecode,
wherein the processor is further configured to:
play the second audio track;
detect, while playing the second audio track, an audio track transitioning trigger to associate one or more of the remaining plurality of media files with one or more of the plurality of second audio samples; and
associate the corresponding one or more of the remaining plurality of media files with the one or more of the plurality of second audio samples in response to the detected audio track transitioning trigger.

11. The system of claim 10, wherein the media file transition trigger includes one of a key press or a screen touch.

12. The system of claim 10, wherein the transceiver is further configured to receive one or more edits to the plurality of media files, and further wherein the processor is further configured to:
update the plurality of media files to reflect the received one or more edits;
receive a further media file transition trigger to associate one or more of the updated plurality of media files with one or more of the plurality of audio samples of the audio track; and
associate the one or more of the updated plurality of media files with the one or more of the plurality of audio samples based on the received trigger.

13. The system of claim 12, wherein the one or more edits to the plurality of media files includes one or more of changing the predefined order of the plurality of media files, adding new media file, and deleting a media file from the plurality of media files.

14. The system of claim 10, wherein the transceiver is further configured to receive input to replay the audio track, and further wherein the processor is further configured to:
replay the audio track based on the received input;

detect, while the audio track is being replayed, a second media file transition trigger, the second media file transition trigger identifying a second audio sample from the plurality of audio samples of the audio track to transition from the first media file to the second media file of the plurality of media files;

obtain a timecode indexed with the identified second audio sample of the audio track corresponding to the detected second media file transition trigger; and update the association of the metadata of the second media file to reflect the association of the metadata of the second media file with the obtained timecode indexed with the identified second audio sample.

15. The system of claim 10, wherein the media file comprises one or more of an image and a video.

16. The system of claim 10, wherein the second media file is a video, the transceiver is further configured to receive input to identify a start point of the second media file, the identified start point of the second media file indicating a point from which the second media file starts playing when transitioned, and further wherein the processor is configured to:

transition from the first media file to the second media file at the identified start point.

17. The system of claim 10, wherein the first media file is a video, the transceiver is further configured to receive input to identify an end point of the first media file, the identified end point of the first media file indicating a point at which the first media file transitions to the second media file, and further wherein the processor is configured to:

transition from the first media file to the second media file at the identified end point.

18. The system of claim 17, wherein the received input is the media file transition trigger.

* * * * *